Jan. 8, 1963   J. GESMAR   3,071,914
FILTER FAN

Filed Oct. 3, 1960   2 Sheets-Sheet 1

Inventor:
Jorgen Gesmar
by *Leonard J. Platt*
His Attorney

Jan. 8, 1963 J. GESMAR 3,071,914
FILTER FAN

Filed Oct. 3, 1960 2 Sheets-Sheet 2

Inventor:
Jorgen Gesmar
by [signature]
His Attorney

Patented Jan. 8, 1963

3,071,914
FILTER FAN
Jorgen Gesmar, Westport, Conn., assignor to General
Electric Company, a corporation of New York
Filed Oct. 3, 1960, Ser. No. 60,123
4 Claims. (Cl. 55—274)

This invention relates to a filter fan and more particularly to an improved filter condition indicator for a filter fan.

Filter fans which include a differential pressure guage for indicating when the filter should be cleaned or replaced, provide a valuable addition to the fan art; but the extent of their use depends to a great degree on the ease with which they may be read without becoming involved in a series of complicated mathematical computations. A simple low cost filter condition indicator which may be easily and securely mounted on a filter fan is especially desirable.

Accordingly, it is a primary object of this invention to provide an improved filter condition indicator which is simple in structure and capable of being manufactured and installed in a filter fan at low cost.

It is another object of this invention to provide a filter condition indicator which may be easily and quickly read.

In accordance with one aspect of this invention, there is provided a filter fan comprising a casing having an air inlet opening and an air exhaust opening. A fan is mounted in the casing for moving air in the inlet opening and out the exhaust opening, and a filter is suitably positioned within the casing for filtering the air passing therethrough. A unique filter condition indicator comprising a hollow indicator tube integrally formed with a hollow connecting tube is provided. One end of the connecting tube extends into the casing for transmitting the air pressure in the casing on one side of the filter to the upper end of the indicator tube, while the lower end of the indicator tube is arranged for sensing the room air pressure on the other side of the filter. A float is provided for movement in the tube in response to a predetermined pressure differential between points on opposite sides of the filter. The float and the indicator tube are designed so that the float has an observable position at the lower end of the indicator tube and is instantaneously movable to an observable position at the upper end of the indicator tube when the filter becomes so clogged that it should be changed. By this arrangement, a very simple and yet effective, filter condition indicator which may be quickly read without becoming involved in a series of mathematical computations is provided.

Other objects and attendant advantages of this invention will be apparent from the following description taken in connection with the accompanying drawing in which.

Figure 1:
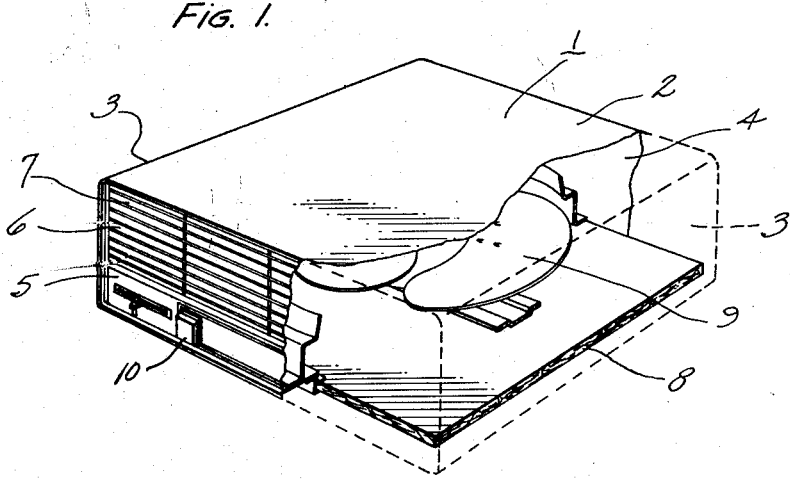
FIG. 1 is a front perspective view partially in cross section of a filter fan embodying my invention.

Referring now to FIG. 1 of the drawing, the filter fan to which the present invention is especially adapted, consists of a casing 1 having top, side and rear panels 2, 3, and 4, respectively. A front panel 5, preferably formed of plastic, is provided with a plurality of horizontal louvers 6 and is suitably inserted in a front air outlet opening 7 of the filter fan, while a removable filter arrangement 8 is provided for insertion in an enlarged bottom air inlet opening of the filter fan. A fan 9 is centrally located within the casing for drawing air into the casing through the filter 8 and for forcing the filtered air outwardly between louvers 6. With this arrangement, it will be understood that rotation of the fan will effect a slight decrease in the pressure of the air between the filter media and the fan blades. It will also be understood that the air pressure in this space between the fan blades and the filter will continue to decrease as the filter collects and becomes clogged with foreign particles.

Figure 2:
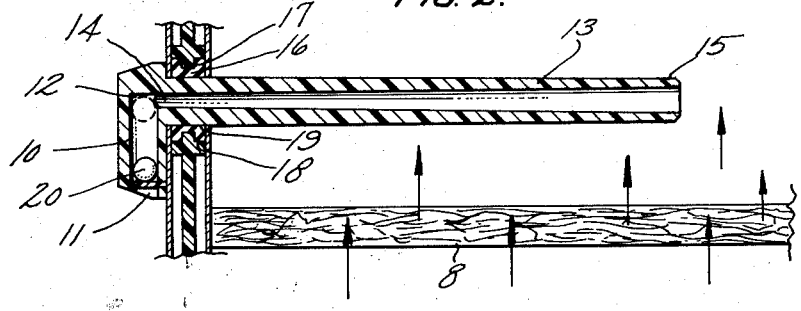
FIG. 2 is a cross-sectional view showing my improved filter condition indicator.

In accordance with my invention, a unique differential pressure sensing and indicating device is provided for sensing a pre-determined pressure differential between the room air pressure at one side of the filter and the pressure of the air at the opposite side of the filter. This precalculated pressure differential being that pressure differential at which the filter media becomes so clogged with foreign particles that it should be cleaned or replaced with a new filter. As best seen in FIG. 2, my unique indicator includes a hollow generally vertical indicator tube 10 having an open lower end 11 and an upper end 12. A hollow pressure transmitting connecting tube 13 is integrally formed with the hollow indicator tube 10 and as shown, one end 14 of the connecting tube is in air communication with the upper end 12 of the indicator tube while the other end 15 of the connecting tube 13 is positioned in the space between the filter and the fan blades.

A unique simple arrangement is provided for securely holding my improved pressure sensing and indicating device on the front panel 5 of the filter fan. As best viewed in FIG. 2, a rubber grommet 16 provided with a peripheral annular groove 17 may be readily pressed into a complementary aperture 18 formed in the plastic front panel 5 of the filter fan. A central aperture 19 is formed in the grommet and the outer surface of the connecting tube 13 is tapered. With this arrangement, the reduced end 15 of the connecting tube may be readily inserted within the aperture 19 formed in the rubber grommet and pushed rearwardly thereby permitting the rubber grommet to grip the outer surface of the connecting tube. Thus, my improved fan filter condition indicator may be securely attached to the front panel of the filter fan in the position shown in FIG. 2.

Figure 4:
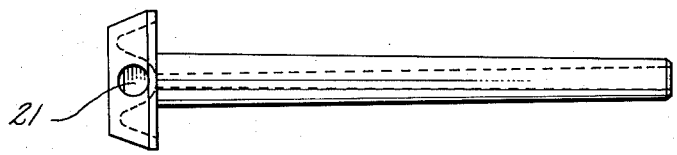
FIG. 4 is a bottom plan view of my improved filter condition indicator.
Figure 5:
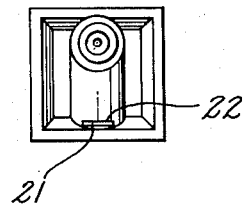
FIG. 5 is a rear elevational view of the filter condition indicator.

A lightweight plastic float 20 is uniquely arranged with respect to the bore of the vertical indicator tube 10 for movement in response to the precalculated pressure differential at which the filter media becomes so clogged with foreign particles that it should be cleaned or replaced with a new filter. As shown more particularly in FIGS. 4 and 5, the ball 20 may be inserted in the open lower end 11 of the vertical indicator tube 10. A stop member 21 preferably formed of a small piece of plastic may be inserted in a slot 22 formed at the bottom rear of the vertical tube for partially closing the opening at the lower end of the tube to prevent the ball from falling therethrough. The integrally formed hollow vertical indicator tube and connecting tube are preferably formed of a clear plastic material and the indicator ball may be colored red or some other suitable color so that the position of the ball in the indicator tube may be readily observed.

Figure 3:
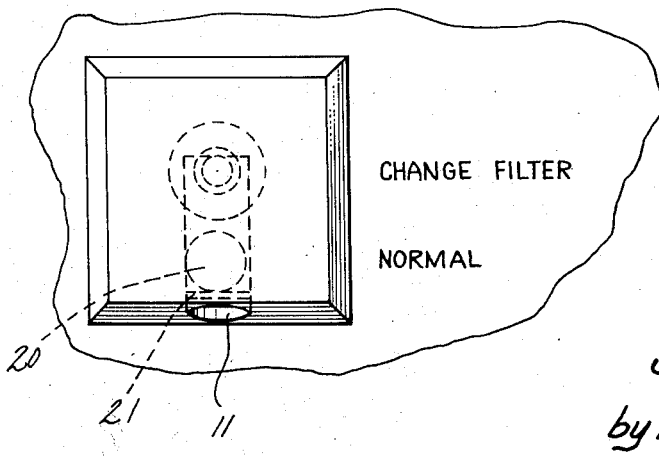
FIG. 3 is an enlarged front elevational view of the filter condition indicator and a portion of the panel upon which it is mounted.

As indicated in FIG. 3 the normal position of the ball is at the bottom of the vertical tube resting on stop member 21, and as long as the pressure differential remains below the precalculated pressure differential mentioned above, the ball will remain at the lower end of the tube. In accordance with my invention, the bore of the tube is substantially cylindrical and the weight, diameter and density of the ball 20 are arranged so that as soon as the previously calculated pressure differential is reached the ball 20 is instantaneously moved from its position at the lower end of the tube to its position at the upper end of the tube, as shown by the dotted lines, in FIG. 2. Accordingly, since the float only has two observable positions my improved indicator may be easily and quickly read without becoming involved in a series of mathematical computations.

From the foregoing description it will be appreciated that the improved filter condition indicator comprises only three parts; an integrally formed vertical and horizontal tube, a lightweight plastic ball 20 and a plastic stop plate 21. Further, an easily formed grommet 16 is provided for inexpensively connecting the filter condition indicator to the fan casing. Thus, an exceedingly simple and inexpensive filter condition indicator is provided for indicating the condition of a filter for a fan.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim is:

1. A filter fan comprising a casing having an air inlet opening and an air exhaust opening; a fan mounted in said casing for moving air in said inlet opening and out said exhaust opening; a filter positioned in said casing for filtering the air passing therethrough; a hollow indicator tube having an open lower end in communication with atmospheric air outside of said casing and a closed upper end; a hollow connecting tube integrally formed with said indicator tube having one of its ends in air communication with the upper end of said indicator tube, the other end of said connecting tube extending into said casing for transmitting the air pressure in said casing to the upper end of said indicator tube; and a float arranged for movement in said indicator tube, said float having an observable position at the upper end of said indicator tube and an observable position at the lower end of the indicator tube and being instantaneously movable from one of said positions to the other one of said positions for indicating the condition of the filter.

2. A filter fan comprising a casing having an air inlet opening and an air exhaust opening; a fan mounted in said casing for moving air in said inlet opening and out said exhaust opening; a filter positioned in said casing for filtering the air passing therethrough; a hollow indicator tube having an open lower end in communication with atmospheric air outside of said casing and a closed upper end; a hollow connecting tube integrally formed with said indicator tube having one of its ends in air communication with the upper end of said indicator tube, the other end of said connecting tube extending into said casing for transmitting the air pressure in said casing to the upper end of said indicator tube, the indicator tube having a generally cylindrical bore; and a ball float arranged for movement in said indicator tube, said float having a normal observable position at the lower end of the tube for indicating that the filter is operating satisfactorily and an observable position at the upper end of the tube for indicating that the filter should be changed, said float being movable instantaneously from its normal position at the lower end of the tube to its position at the upper end of the tube as soon as a predetermined pressure differential between the inside of said casing and the atmosphere has been reached, said predetermined pressure differential being the pressure differential which exists when the filter media becomes clogged to the extent that it should be changed.

3. A filter fan comprising a casing having an air inlet opening and an air exhaust opening; a fan mounted in said casing for moving air in said inlet opening and out said exhaust opening; a filter positioned in said casing for filtering the air passing therethrough; a hollow indicator tube having an open lower end in communication with atmospheric air outside of said casing and a closed upper end; a hollow connecting tube integrally formed with said indicator tube having one of its ends in air communication with the upper end of said indicator tube, the other end of said connecting tube extending into said casing for transmitting the air pressure in said casing to the upper end of said indicator tube, a resilient grommet mounted on said casing, said connecting tube being provided with a tapered outer surface whereby the connecting tube may be readily inserted in the grommet thereby permitting the grommet to securely grip and hold the connecting tube; and a float arranged for movement in said tube, said float having an observable position at the upper end of said indicator tube and an observable position at the lower end of the indicator tube and being instantaneously movable from one of said positions to the other one of said positions for indicating the condition of the filter.

4. A filter fan comprising a casing having an air inlet opening and an air exhaust opening; a fan mounted in said casing for moving air in said inlet opening and out said exhaust opening; a filter positioned in said casing for filtering the air passing therethrough; a hollow indicator tube having a closed open lower end in communication with atmospheric air outside of said casing and a closed upper end; a hollow connecting tube integrally formed with said indicator tube having one of its ends in air communication with the upper end of said indicator tube, the other end of said connecting tube extending into said casing for transmitting the air pressure in said casing to the upper end of said indicator tube; a float arranged for movement in said indicator tube, said float having an observable position at the upper end of said indicator tube and an observable position at the lower end of the indicator tube, said float being instantaneously movable from one of said positions to the other one of said positions for indicating the condition of the filter, and stop means provided at the lower end of the indicator tube for holding said ball within the indicator tube.

References Cited in the file of this patent

UNITED STATES PATENTS

| | | |
|---|---|---|
| 1,959,759 | Hultberg | May 22, 1934 |
| 2,013,136 | Cornelius | Sept. 3, 1935 |
| 2,034,373 | Bilde | Mar. 17, 1936 |
| 2,811,808 | Briese | Nov. 5, 1957 |
| 2,954,751 | Barnes | Oct. 4, 1960 |

UNITED STATES PATENT OFFICE

CERTIFICATE OF CORRECTION

Patent No. 3,071,914                      January 8, 1963

Jorgen Gesmar

It is hereby certified that error appears in the above numbered patent requiring correction and that the said Letters Patent should read as corrected below.

Column 4, line 38, for "a closed open" read -- an open --.

Signed and sealed this 20th day of August 1963.

(SEAL)
Attest:

ERNEST W. SWIDER                      DAVID L. LADD
Attesting Officer                      Commissioner of Patents